(12) United States Patent
Tolkacz

(10) Patent No.: US 8,903,580 B2
(45) Date of Patent: Dec. 2, 2014

(54) HYBRID VEHICLE WITH DYNAMICALLY-ALLOCATED HIGH-VOLTAGE ELECTRICAL POWER

(71) Applicant: GM Global Technology Operations LLC, Detroit, MI (US)

(72) Inventor: Joseph M. Tolkacz, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 13/676,794

(22) Filed: Nov. 14, 2012

(65) Prior Publication Data

US 2014/0136034 A1    May 15, 2014

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/00 | (2006.01) |
| B60W 10/08 | (2006.01) |
| B60W 30/188 | (2012.01) |
| B60W 10/22 | (2006.01) |
| B60K 6/28 | (2007.10) |
| B60K 6/442 | (2007.10) |

(52) U.S. Cl.
CPC .......... *B60W 30/1886* (2013.01); *B60W 20/00* (2013.01); *B60W 10/08* (2013.01); *B60Y 2400/112* (2013.01); *B60W 10/22* (2013.01); *B60K 6/28* (2013.01); *B60W 2720/16* (2013.01); *B60W 2510/20* (2013.01); *B60W 2720/18* (2013.01); *B60K 6/442* (2013.01)
USPC .......................................................... 701/22

(58) Field of Classification Search
CPC ..... B69W 10/06; B69W 10/30; B69W 10/08; B69W 20/00
USPC .......................................................... 701/22
See application file for complete search history.

(56) References Cited

U.S. PATENT DOCUMENTS

| | | | |
|---|---|---|---|
| 6,616,569 B2* | 9/2003 | Hoang et al. | 477/3 |
| 7,980,340 B2* | 7/2011 | Luo et al. | 180/65.21 |
| 8,028,778 B2* | 10/2011 | Luo et al. | 180/65.22 |
| 8,091,659 B2* | 1/2012 | Luo et al. | 180/65.22 |
| 8,478,466 B2* | 7/2013 | Luo et al. | 701/22 |
| 2002/0103589 A1* | 8/2002 | Millsap et al. | 701/42 |
| 2003/0116373 A1* | 6/2003 | Miller et al. | 180/167 |
| 2004/0041358 A1* | 3/2004 | Hrovat et al. | 280/5.502 |
| 2009/0166123 A1* | 7/2009 | Luo et al. | 180/383 |
| 2010/0116572 A1* | 5/2010 | Schmitt et al. | 180/65.51 |

(Continued)

*Primary Examiner* — Mary Cheung
*Assistant Examiner* — Frederick Brushaber
(74) *Attorney, Agent, or Firm* — Quinn Law Group, PLLC

(57) ABSTRACT

A vehicle includes a high-voltage (HV) battery pack, an HV electric traction motor, an additional HV system such as suspension motors of an active suspension system, sensors, and a controller in communication with the sensors. The controller dynamically allocates HV power from the battery pack between the traction motor(s) and the additional HV system using signals from the sensors. Signals may include steering angle, acceleration, and throttle request. A method includes measuring input signals using sensor(s) and processing the measured input signals, including comparing each of the measured input signals to a corresponding threshold. The method also includes allocating some of the HV power from the battery pack via between the traction motor(s) and the additional HV system when the values of any one of the input signals exceeds a corresponding threshold.

19 Claims, 2 Drawing Sheets

(56) References Cited

U.S. PATENT DOCUMENTS

| | | | |
|---|---|---|---|
| 2010/0228419 A1* | 9/2010 | Lee et al. | 701/25 |
| 2010/0305792 A1* | 12/2010 | Wilk et al. | 701/22 |
| 2010/0318252 A1* | 12/2010 | Izumi | 701/22 |
| 2011/0190972 A1* | 8/2011 | Timmons et al. | 701/29 |
| 2011/0307130 A1* | 12/2011 | Gow et al. | 701/22 |
| 2013/0297133 A1* | 11/2013 | Hasegawa | 701/22 |
| 2013/0332016 A1* | 12/2013 | Suzuki et al. | 701/22 |
| 2014/0046525 A1* | 2/2014 | Lee et al. | 701/22 |
| 2014/0067183 A1* | 3/2014 | Sisk | 701/22 |
| 2014/0081497 A1* | 3/2014 | Jeon et al. | 701/22 |

* cited by examiner

HYBRID VEHICLE WITH DYNAMICALLY-ALLOCATED HIGH-VOLTAGE ELECTRICAL POWER

TECHNICAL FIELD

This disclosure relates to a hybrid vehicle with dynamically-allocated high-voltage electrical power.

BACKGROUND

Hybrid electric vehicles use multiple prime movers for optimum fuel economy. An internal combustion engine provides input torque to a transmission at higher vehicle speeds, i.e., when the engine is relatively efficient. At vehicle launch and while traveling below a threshold vehicle speed, one or more high-voltage electric traction motors may provide the required input torque. Such traction motors draw power from a rechargeable battery pack. Motor torque from the electric traction motor(s) is also used as needed to assist the engine in propelling the vehicle, e.g., during transient periods of increased torque request. Hybrid electric vehicles typically include other fuel saving features such as automatic engine shutoff at idle and regenerative braking

SUMMARY

A hybrid electric vehicle is disclosed herein. The vehicle includes a high-voltage (HV) battery pack, one or more HV electric traction motors, and at least one additional HV system. As used herein, the term "HV" refers to voltage levels that are substantially greater than the 12-15 VDC auxiliary voltages typically used in vehicle applications. For example, the battery pack may be rated for at least 48 VDC to over 300 VDC depending on the powertrain design used in the vehicle. The additional HV system(s) in the example embodiment described hereinbelow is an active suspension system of the type known in the art. Such a system typically positions electromagnetic suspension motors with respect to a corresponding wheel of the vehicle. The suspension motors are used as fast actuators to quickly counter forces acting at the corners of the vehicle while negotiating turns or when traveling on uneven/broken pavement as explained below.

The vehicle also includes a controller which executes instructions from memory to dynamically allocate available power from the HV battery pack to the electric traction motor(s) and the additional HV system(s) in response to a set of input signals. Execution of the present method may help to avoid the need to oversize the battery pack in order to account for the electrical load of the additional HV system, or alternatively to avoid adding another dedicated HV battery pack and its associated weight and packaging space to the vehicle architecture.

In particular, a vehicle is disclosed herein having a battery pack, an electric traction motor, and an additional system, all of which are HV devices as that term is defined herein. The electric traction motor(s) and the additional system(s) are powered via the same HV battery pack. The vehicle includes a controller embodied as one or more computer devices each having a processor and tangible, non-transitory memory. Instructions recorded in the memory embody a method for dynamically allocating HV battery power between the various HV devices in response to input signals from a set of sensors as set forth herein.

In an example embodiment, the additional system includes an active suspension system, which in turn includes a plurality of HV suspension motors each positioned with respect to a corresponding wheel of the vehicle. The input signals may include a steering angle and a throttle level. Additional input signals may include optional accelerometer signals measured via corresponding accelerometers for different axes of the vehicle. The controller processes the received input signals and generates an output signal that allocates available battery power to the electric traction motor(s), the suspension motors, or both depending on the values of the received input signals.

A method includes measuring input signals using at least one sensor of a vehicle having an HV battery pack, an HV electric traction motor, and an additional HV system. The HV electric traction motor and the additional HV system are both electrically connected to the HV battery pack. The method also includes processing the measured input signals via a processor of a controller, including comparing each of the measured input signals to a corresponding threshold. Additionally, the method includes allocating power from the HV battery pack via between the electric traction motor and the additional HV system, via the controller, when the values of any one of the input signals exceeds its corresponding threshold.

In another example embodiment, the vehicle includes wheels, an HV battery pack, a transmission having an input member and an output member, first and second HV electric traction motors, a steering wheel, an active suspension system, and a controller. The first electric traction motor is connected to the input member via a first clutch, while the second electric traction motor is connected to the output member via a second clutch. The battery pack and the electric traction motors are rated for at least 48 VDC in this embodiment. A steering angle sensor, which is positioned with respect to the steering wheel, measures a steering angle of the steering wheel. The controller is in communication with the steering angle sensor, and dynamically allocates power from the HV battery pack to the electric traction motors and the suspension motors in a manner that varies with the values of the steering angle and a throttle request, as well as any activity of the vehicle's suspension system.

The above features and the advantages of the present disclosure are readily apparent from the following detailed description of the best modes for carrying out the invention when taken in connection with the accompanying drawings.

DETAILED DESCRIPTION

Figure 1:
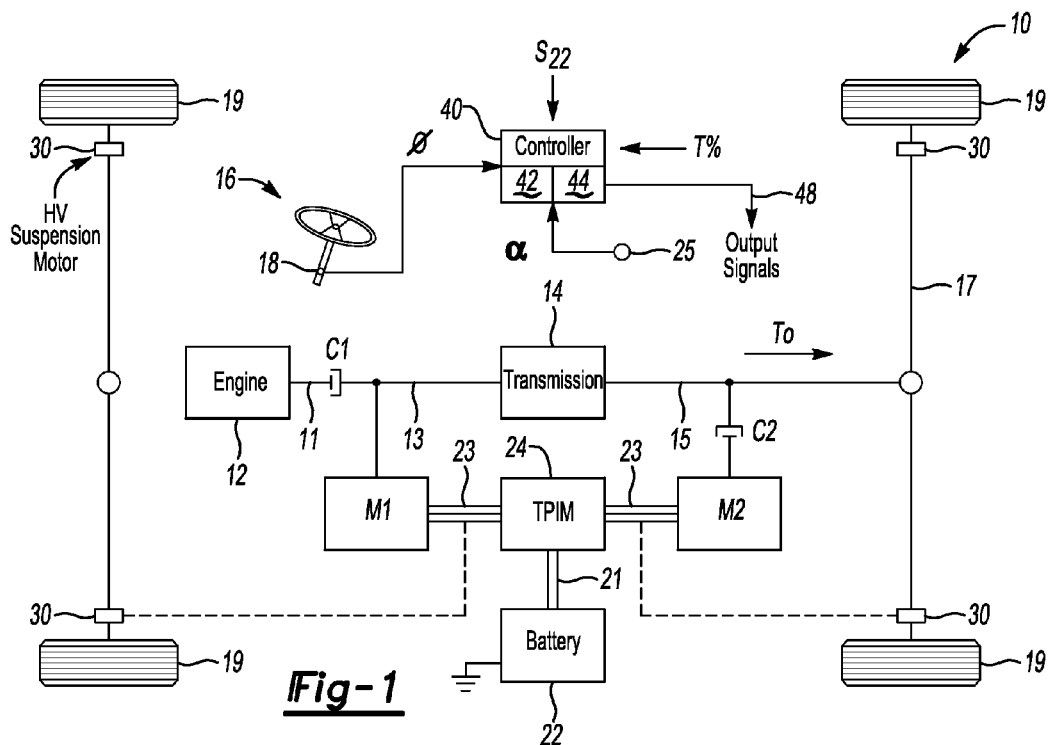
FIG. 1 is a schematic illustration of an example vehicle having a high-voltage battery pack and a controller that dynamically allocates power from the battery pack as in response to input signals set forth herein.

Referring to the drawings, a vehicle 10 is shown schematically in FIG. 1 having a steering wheel 16 and a plurality of wheels 19. The vehicle 10 may include an internal combustion engine 12, first and second electric traction motors M1 and M2, an automatic transmission 14, and a high-voltage (HV) battery pack 22. In another embodiment, only one of the electric traction motors M1 and M2 is used, with the associated control approaches for both embodiments described below with reference to FIG. 2. The vehicle 10 also includes at least one additional HV system, which is shown in FIG. 1 as an example active suspension system having a plurality of HV suspension motors 30. A controller 40 is configured to dynamically allocate power from the HV battery pack 22 between the electric traction motor(s) M1 and/or M2 and the HV suspension motors 30. An example method 100 for doing this is set forth in detail below with reference to FIG. 2.

As is known in the art, an active suspension system of the type illustrated in FIG. 1 places an HV suspension motor 30 in proximity to each wheel 19. The various HV suspension motors 30 are controlled as fast actuators to rapidly and instantaneously counteract forces acting at a particular corner of the vehicle 10, e.g., while driving on uneven pavement or when turning, particularly on undulating and/or curvy road surfaces. Depending on the driving maneuver and the road surface conditions, each HV suspension motor 30 may require a continuous average power draw ranging from a few dozen watts (W) to well over 5 kW.

The HV battery pack 22 may be embodied as a multi-cell lithium ion, nickel metal hydride, or other suitable energy storage system. As used herein, the term "high-voltage" generally refers to a voltage level of about four times the voltage level of a typical 12-15 VDC auxiliary voltage, e.g., 48 VDC or more. Thus, auxiliary voltages are considered to be low voltage, with all voltages well in excess of auxiliary levels being high voltage. The battery pack 22 may be rated from about 48 VDC-300 VDC or more depending on the power requirements of the electric traction motors M1 and M2, the HV suspension motors 30, and any other HV systems drawing power from the HV battery pack 22.

Each of the electric traction motors M1 and M2, when configured as multi-phase/alternating current electric machines, may be connected via an AC bus 23 to a traction power inverter module (TPIM) 24. While not shown in FIG. 1 for illustrative clarity, each HV suspension motor 30 may be connected to the AC bus 23 when configured as AC electric machines. The TPIM 24 is connected to the battery pack 22 via a DC bus 21. As is understood in the art, DC-to-AC and AC-to-DC power conversion may be achieved via rapid semiconductor switching, for instance using banks of MOSFET or IGBT semiconductor switches. While omitted for simplicity from FIG. 1, such components may be housed within the TPIM 24 and controlled via pulse width modulation or other means to provide the required output voltage. Thus, electrical power may be automatically converted via the TPIM 24 as needed.

The transmission 14 shown in FIG. 1 includes an input member 13 and output member 15. The respective input and output members 13 and 15 may be selectively connected to each other at a desired speed ratio via a plurality of gear sets (not shown). Input torque from the engine 12 and/or the first electric traction motor M1 is transferred through the transmission 14 such that output torque (arrow $T_O$) is ultimately transferred to the output member 15, and thereafter to the drive axles 17 and any wheels 19 connected thereto.

Each prime mover of the vehicle 10 may be selectively connected to/disconnected from the vehicle's powertrain as needed. To this end, a first clutch C1 may be applied to connect a driveshaft 11 of the engine 12 to the input member 13 of the transmission 14. Likewise, a second clutch C2 may be applied to connect the second electric traction motor M2 to the output member 15. A third clutch (not shown) may be used to disconnect the first electric traction motor M1 from the transmission 14 as needed, e.g., to reduce spin losses.

The controller 40, which may be embodied as one or more digital computer devices, executes logic recorded in tangible, non-transitory memory 42, via a processor 44, to determine when all available power from the battery pack 22 should be allocated to powering the electric traction motors M1 and/or M2, and when some of the available power from the battery pack 22 should be allocated to the HV suspension motor(s) 30. An example method 100 for accomplishing this goal is described below with reference to FIGS. 2 and 3.

Structurally, the memory 42 may include read-only memory (ROM), flash memory, optical memory, additional magnetic memory, etc. The controller 40 may also include random access memory (RAM), electrically programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the method 100 of FIG. 2 may be recorded in the memory 42 and executed via the processor(s) 44.

The controller 40 may be configured to determine a state of charge (SOC) (arrow $S_{22}$) of the HV battery pack 22, and to allocate power from the battery pack 22 according to the method 100 as described below only when the SOC exceeds a calibrated SOC threshold. If the SOC is sufficient, the controller 40 receives, as a set of input signals, various measured and/or calculated signals describing different performance characteristics of the vehicle 10 shown in FIG. 1.

The controller 40 may receive as input signals values describing activity of the suspension system. For instance, the controller 40 may receive a measured steering angle (arrow) from a steering angle sensor 18 positioned with respect to the steering wheel 16 and/or a steering column connected thereto, accelerometer readings (arrow $\alpha$) from one or more accelerometers 25, and a throttle level (arrow T %) corresponding to the torque request, e.g., an amount of force applied to or an amount of travel of an accelerator pedal (not shown). The controller 40, upon executing instructions embodying the method 100 of FIG. 2, then transmits a set of output signals (arrow 48) to the battery pack 22 and any associated power flow control elements thereof to thereby allocate output power from the battery pack 22.

An overall approach to allocating HV power aboard the vehicle 10 will now be described with reference to FIG. 2, with continued reference to the structural elements shown in FIG. 1. An example method 100 for allocating power aboard the vehicle 10 begins upon initialization (*), e.g., at startup, with step 102, wherein the controller 40 determines whether a shift of the transmission 14 is in progress. Step 102 is shown in phantom to indicate that the need for this step may depend on the configuration of the powertrain of the vehicle 10.

That is, when two HV electric traction motors M1 and M2 are used as shown, one motor, in this case electric fraction motors M1, typically regulates the speed of the engine 12 during a shift while the other motor (electric traction motor M2) powers the output member 15. In a powertrain using just one electric traction motor, e.g., electric traction motor M1, step 102 may be omitted. The shift may be detected using any suitable steps, e.g., via receipt of a shift command from a separate or integrated transmission control unit (not shown). If at step 102 it is determined that a shift is in progress, the method 100 proceeds to step 103. Otherwise, the method 100 proceeds to step 104. Variants of the method 100 forgoing use of step 102 may commence with step 104.

Step 103 entails allocating all available power from the battery pack 22 to the electric traction motor(s) M1 and/or M2, up to a power limit of the electric traction motors M1 and/or M2. Step 103 thus entails not only dynamic allocation of HV power to the electric traction motors M1 and/or M2, i.e., allocation occurring in real-time while the vehicle 10 is in operation and in response to the values of the various input signals received at step 102, but also dynamic prioritization of energy flow. Step 103 thus ensures that the electric traction motors M1 and/or M2 are fully energized in response to the conditions of step 102, as well as to step 108 described below. The method 100 then proceeds to step 112.

Step 104 entails measuring the steering angle (arrow) via the steering angle sensor 18 and determining whether the measured steering angle exceeds zero or a low non-zero threshold. The purpose of step 104 is to determine whether the vehicle 10 is presently executing a steering maneuver in which one or more of the HV suspension motors 30 of FIG. 1 may be activated. In other embodiments in which the additional HV system(s) are something other than an active suspension system, step 104 may entail measuring any other value indicating that the additional system(s) are active. Staying with the active suspension system example for consistency, method 100 proceeds to step 111 if the steering angle (arrow) exceeds the calibrated threshold. The method 100 otherwise proceeds to step 106.

At step 106, which is optional, the controller 40 may next determine whether any laterally- or longitudinally-arranged accelerometers 25 are active. In a typical x, y, z coordinate system, one may consider the direction of travel to be the longitudinal (y) direction and the direction of the width of the vehicle 10 to be the lateral (x) direction. A different accelerometer 25 may be positioned on each of these axes. If either accelerometer 25 is active, i.e., presently reading an acceleration value above zero, in absolute value, the method 100 proceeds to step 111. Otherwise, the method 100 proceeds to step 108.

Step 108 includes determining whether a calibrated threshold wide open throttle (WOT) condition is present. As will be understood in the art, a WOT condition is triggered when a driver fully depresses an accelerator pedal (not shown) and thereby requests output torque at a maximum possible level. In a simplified embodiment, step 108 may entail determining whether any WOT condition is present, while another embodiment includes evaluating, via the controller 40, whether a critical part of the WOT condition is present.

Figure 3:
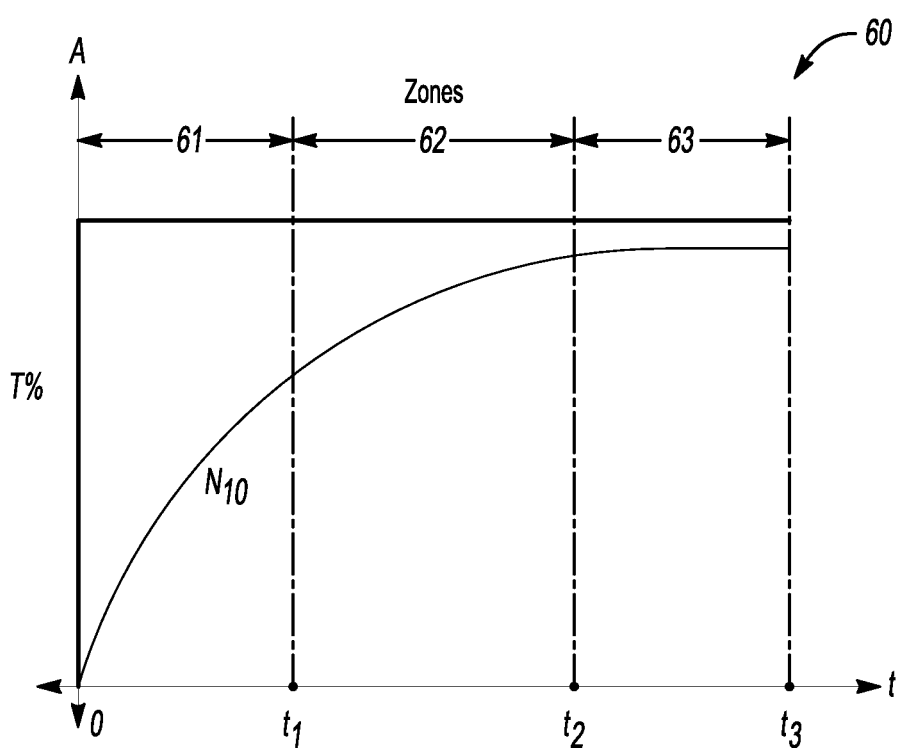
FIG. 3 is a set of throttle request and vehicle speed traces for the vehicle of FIG. 1.

Referring briefly to FIG. 3, a set of traces 60 is shown for the vehicle 10 of FIG. 1 representing a wide-open throttle request starting at $t_0$, with time (t) plotted on the horizontal axis and amplitude (A) plotted on the vertical axis. The traces 60 include a vehicle speed trace ($N_{10}$), e.g., mean speed of the road wheels 19, and throttle request (T%). As motor torque is, essentially, instantaneously available relative to engine torque, electric motors such as the HV electric traction motors M1 and M2 are most efficient at vehicle launch. At higher speeds, the engine 12 becomes relatively more efficient. Therefore, typical hybrid powertrains prioritize motor torque at low speeds and engine torque at high speeds, with motor torque frequently assisting engine torque as needed, e.g., during transient periods of increased torque request.

In some HV systems such as the example active suspension system described herein, peak use of the HV suspension motors 30 may occur when cornering and braking, as well as when driving on uneven or broken pavement. Therefore, the controller 40 may divide the range of trace 60 into different zones 61, 62, and 63, and may designate a particular zone, e.g., zone 62, as being less "critical" than, for instance, zone 61. That is, when traveling in zone 61 between $t_0$ and $t_1$, this may require all available torque, and thus power, from the electric traction motors M1 and/or M2. In zone 62 between $t_1$ and $t_2$, as engine torque becomes available and relatively more efficient, some motor torque/power may be available for other purposes. Zone 63 between $t_2$ and $t_3$ may again require torque from the electric traction motors M1 and/or M2, e.g., in an electric assist capacity.

Referring again to FIG. 2, step 108 may therefore include determining whether a critical part of the WOT condition is present. If present, the method 100 proceeds to step 103. Otherwise, the method 100 proceeds to step 110.

Step 110, which is an optional step, may include determining via the controller 40 whether any other conditions are present, e.g., whether another accelerometer 25 is active, such as a z-axis accelerometer. Use of such an accelerometer 25 may be useful in determining whether the vehicle 10 is driving over uneven pavement. For example, when a given wheel 19 hits a pothole, that wheel 19 rapidly drops and rises in the z-direction. If at step 110 the controller 40 determines that such an accelerometer 25 is active, the method 100 proceeds to step 111. The method 100 proceeds in the alternative to step 112 if the controller 40 determines that such a z-axis accelerometer 25 is not active.

Step 111 includes allocating power from the HV battery pack 22 to the HV suspension motor(s) 30. That is, the power requirements of the HV suspension motors 30 are prioritized relative to those of the electric traction motors M1 and M2. Step 111 may be reached from any of steps 104, 106, and 110. Recall that in each of these steps, a decision is made by the controller 40 that the vehicle 10 is either turning (steps 104, 106) or driving over an uneven surface (step 108). As a result, the controller 40 can ensure that the power requirements of the HV suspension motors 30 are properly met, effectively borrowing some of the available output power of the battery pack 22 for use by the HV suspension motors 30 when the electric traction motors M1, M2 do not otherwise require full power. The method 100 is complete (**), beginning anew with step 102.

At step 112, the controller 40 allocates power from the battery pack 22 between the HV suspension motor(s) 30 and the traction motors M1 and M2, with priority given to the electric traction motors M1 and M2. Step 112 may be arrived at via different paths. For example, if a shift is in progress at step 102, or if the WOT condition of step 108 is active, all power is allocated to the electric traction motors M1 and M2 at step 103 as explained above. Any additional power that might remain after satisfying the power requirements of the electric traction motors M1 and M2 may be allocated to the HV suspension motor(s) 30 at step 112, if needed.

However, note that if step 112 is arrived at via step 110, this means that a shift is not in progress (step 102), the steering angle ( ) from step 104 is zero, the vehicle 10 is operating in zone 62 of FIG. 3, and none of the accelerometers 25 are active (steps 106 and 110). This condition may be considered to be steady-state, in which case the power requirements of the HV suspension motors 30 should be zero or nearly so. Thus, step 112, in all embodiments, prioritizes allocation of power to the traction motors M1 and M2. The method 100 is then finished (**).

Figure 2:
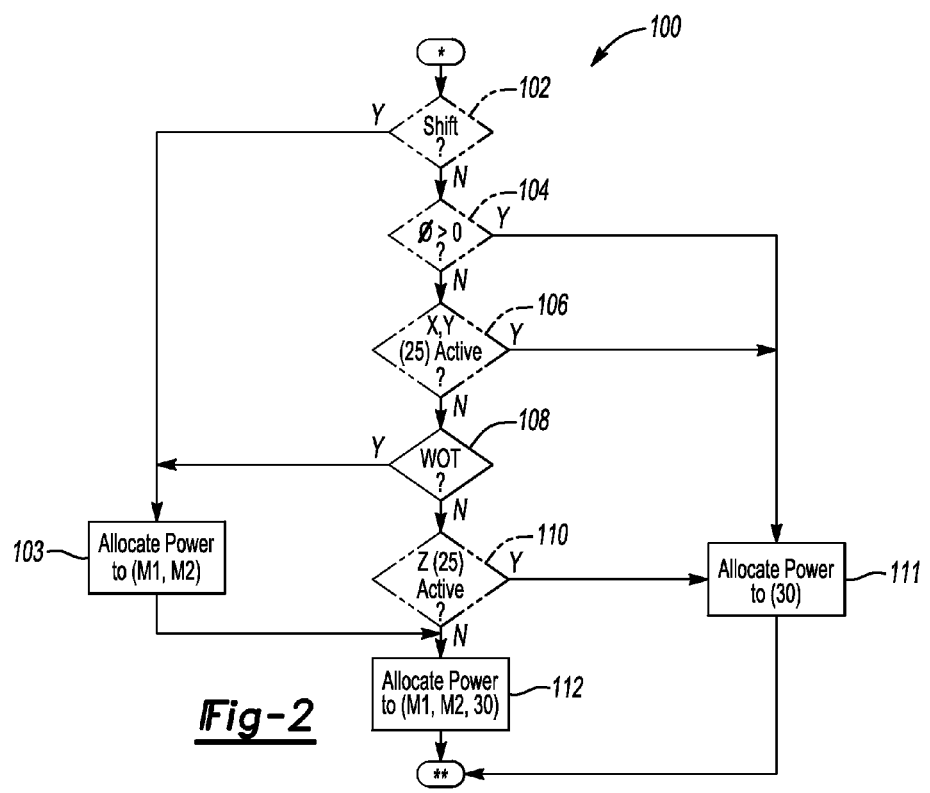
FIG. 2 is a flow chart describing an example method for dynamically allocating power from the battery pack in the vehicle shown in FIG. 1.

Using the method 100 of FIG. 2, the controller 40 of FIG. 1 can dynamically allocate power from the battery pack 22, and in effect arbitrate the different power needs of different high-voltage systems. When the power requirements of the additional HV systems are low, such as a peak power requirement of only a few hundred watts, sufficient excess capacity may exist that obviates the need for such an approach. However, emerging HV systems such as the active suspension system described herein may require, at times, well over 5 kW of continuous power. Depending on the requirements of the powertrain for traction, a conflict may result between the needs of the electric traction motors M1, M2 and those of the additional HV systems. The method 100 is thus intended to help solve this particular problem.

As will be appreciated by one of ordinary skill in the art, proper execution of the method 100 relies on a determination that the SOC of the battery pack 22 is already sufficient. Typically, a battery SOC is controlled within an allowable range of a maximum (100%) charge. Thus, when the SOC drops below a threshold, e.g., 25 to 40% of maximum, steps are taken in the overall powertrain control scheme to bring the SOC back to a calibrated charge, e.g., 60 to 80% of maximum. The steps of method 100 thus assume that the SOC of the battery pack 22 is already within the allowable range.

While the best modes for carrying out the invention have been described in detail, those familiar with the art to which this invention relates will recognize various alternative designs and embodiments for practicing the invention within the scope of the appended claims.

The invention claimed is:

1. A vehicle having a transmission, the vehicle comprising:
   a high-voltage battery pack, wherein the voltage output of the battery pack is at least 48 volts;
   at least one electric traction motor;
   an additional high-voltage system, wherein the at least one electric traction motor and the additional high-voltage system are both electrically connected to and powered via the high-voltage battery pack;
   a plurality of sensors collectively generating input signals, including a throttle request; and
   a controller in communication with the plurality of sensors, and having a processor and tangible, non-transitory memory on which is recorded instructions for dynamically allocating power from the high-voltage battery pack between the electric traction motor and the additional high-voltage system;
   wherein the controller receives and processes the input signals, via the processor, and dynamically allocates the power from the high-voltage battery pack, in real-time while the vehicle is in operation, as a function of the values of the input signals during at least one of a shift of the transmission and a calibrated amount of the throttle request.

2. The vehicle of claim 1, wherein the controller is configured to determine a state of charge (SOC) of the battery pack, and to allocate the power from the battery pack only when the SOC exceeds a calibrated SOC threshold.

3. The vehicle of claim 1, further comprising a set of wheels, wherein the additional high-voltage system is an active steering system having a plurality of high-voltage suspension motors each positioned with respect to a corresponding one of the wheels.

4. The vehicle of claim 3, further comprising a steering wheel having a steering angle sensor, wherein the input signals include the steering angle and a level of throttle request.

5. The vehicle of claim 1, wherein the controller is operable to allocate all available power from the battery pack to the electric traction motor, up to a power limit of the electric traction motor, when the calibrated amount of the throttle request corresponds to a calibrated wide open throttle (WOT) request, and to otherwise allocate a sufficient amount of the available power to the additional high-voltage system.

6. The vehicle of claim 1, wherein the controller is configured to designate a critical WOT region as the calibrated WOT request, and to allocate all available power from the battery pack to the electric traction motor when the critical WOT region is present.

7. The vehicle of claim 6, wherein the set of sensors includes a set of accelerometers, and wherein the input signals include accelerometer output signals for each of the accelerometers.

8. The vehicle of claim 1, wherein the transmission includes an input member and an output member, and wherein the at least one electric traction motor includes a first electric traction connected to the input member of the transmission and a second electric traction motor connected to the output member of the transmission.

9. A method comprising:
   measuring input signals using at least one sensor of a vehicle having a high-voltage battery pack, an electric traction motor, and an additional high-voltage system, wherein the electric traction motor and the additional high-voltage system are both electrically connected to the battery pack and powered thereby using high-voltage of at least 48 volts, including measuring a throttle request to determine whether a calibrated wide open throttle (WOT) condition is present;
   processing the measured input signals via a processor of a controller, including comparing each of the measured input signals to a corresponding threshold; and
   dynamically allocating power from the high-voltage battery pack between the electric traction motor and the additional high-voltage system, via the controller, in real-time while the vehicle is in operation, when the values of any one of the input signals exceeds its corresponding threshold, including allocating all available power from the high-voltage motor to the electric traction motor, up to a power limit of the electric traction motor, when the calibrated WOT condition is present.

10. The method of claim 9, wherein the vehicle includes a set of wheels and the additional high-voltage system is an active steering system having a plurality of high-voltage suspension motors each positioned with respect to a corresponding one of the wheels, and wherein dynamically allocating power from the high-voltage battery pack includes periodically providing at least 1.5 kW of power to each of the high-voltage suspension motors.

11. The method of claim 10, wherein the vehicle includes a steering wheel having a steering angle sensor, measuring the input signals includes measuring a steering angle of the steering wheel, and processing the measured input signals includes comparing the measured steering angle to a steering angle threshold.

12. The method of claim 10, wherein the vehicle includes a set of accelerometers, measuring the input signals includes measuring acceleration values in each of a longitudinal, a lateral, and a vertical direction of the vehicle, and processing the measured input signals includes comparing the measured acceleration values to corresponding acceleration thresholds.

13. The method of claim 9, wherein dynamically allocating power from the high-voltage battery pack includes designating a critical WOT region as the calibrated WOT request, and allocating all available power to the electric traction motor, up to a power limit of the electric traction motor, when the critical WOT region is present.

14. A vehicle comprising:
   a plurality of road wheels;
   a high-voltage battery pack;
   a transmission having an input member and an output member;
   a first electric fraction motor connected to the input member via a first clutch;
   a second electric traction motor connected to the output member via a second clutch, wherein the high-voltage battery pack and the first and second electric traction motors have a voltage output of at least 48 VDC;
   a steering wheel;

a steering angle sensor positioned with respect to the steering wheel and configured to measure a steering angle of the steering wheel;

an active suspension system having a plurality of high-voltage suspension motors, each positioned with respect to a corresponding one of the plurality of road wheels, wherein the electric traction motors and the high-voltage suspension motors are powered via high-voltage from the battery pack; and a controller in communication with the sensors, and having a processor and tangible, non-transitory memory on which is recorded instructions for dynamically allocating power from the high-voltage battery pack to the first and second electric traction motors and the high-voltage suspension motors, wherein the controller is operable to determine a throttle request;

wherein the controller processes the input signals via the processor and allocates the power from the battery pack between the first and second electric traction motors and the active suspension system as a function of the values of the steering angle and the throttle request.

15. The vehicle of claim 14, wherein the controller is configured to determine a battery state of charge (SOC), and to allocate the power from the battery pack only when the battery SOC exceeds a threshold SOC.

16. The vehicle of claim 14, wherein the controller is operable to allocate all available power to the first and second electric fraction motors, up to a power limit of the first and second electric traction motors, when the throttle request corresponds to a calibrated wide open throttle (WOT) request, and to otherwise allocate a sufficient amount of the available power to the high-voltage suspension motors.

17. The vehicle of claim 16, wherein the controller is configured to designate a critical WOT region as the calibrated WOT request, and to allocate all available power to the electric traction motors, up to the power limit, when the critical WOT region is present.

18. The vehicle of claim 14, further comprising a set of accelerometers in communication with the controller, wherein the input signals include measured accelerometer output signals for each of the accelerometers.

19. The vehicle of claim 14, wherein the accelerometers are positioned to measure acceleration of the vehicle in at least three different directions.

* * * * *